US011963286B2

(12) United States Patent
Hansson et al.

(10) Patent No.: US 11,963,286 B2
(45) Date of Patent: Apr. 16, 2024

(54) X-RAY SOURCE AND METHOD FOR GENERATING X-RAY RADIATION

(71) Applicant: Excillum AB, Kista (SE)

(72) Inventors: Björn Hansson, Kista (SE); Per Takman, Kista (SE); Yuli Wang, Kista (SE); Shiho Tanaka, Kista (SE)

(73) Assignee: EXCILLUM AB, Kista (SE)

( * ) Notice: Subject to any disclaimer, the term of this patent is extended or adjusted under 35 U.S.C. 154(b) by 0 days.

(21) Appl. No.: 17/725,152

(22) Filed: Apr. 20, 2022

(65) Prior Publication Data

US 2022/0254595 A1 Aug. 11, 2022

Related U.S. Application Data

(63) Continuation of application No. 16/766,935, filed as application No. PCT/EP2018/083138 on Nov. 30, 2018, now Pat. No. 11,342,154.

(30) Foreign Application Priority Data

Dec. 1, 2017 (EP) .................................... 17204949

(51) Int. Cl.
*H05G 2/00* (2006.01)
*H01J 35/08* (2006.01)
*H01J 35/14* (2006.01)

(52) U.S. Cl.
CPC .............. *H05G 2/006* (2013.01); *H01J 35/08* (2013.01); *H01J 35/14* (2013.01); *H01J 35/153* (2019.05); *H01J 2235/082* (2013.01)

(58) Field of Classification Search
CPC ...... H01J 35/08; H01J 2235/082; H01J 35/14; H01J 35/153; H05G 2/006
See application file for complete search history.

(56) References Cited

U.S. PATENT DOCUMENTS

| | | |
|---|---|---|
| 4,953,191 A | 8/1990 | Smither et al. |
| 5,052,034 A | 9/1991 | Schuster |

(Continued)

FOREIGN PATENT DOCUMENTS

| | | |
|---|---|---|
| CN | 103019038 A | 4/2013 |
| CN | 103250226 A | 8/2013 |

(Continued)

OTHER PUBLICATIONS

Office Action (First review of the opinion notice) dated Oct. 18, 2022, by the China National Intellectual Property Administration in corresponding Chinese Patent Application No. 201880077013.5.

(Continued)

*Primary Examiner* — Chih-Cheng Kao
(74) *Attorney, Agent, or Firm* — BUCHANAN, INGERSOLL & ROONEY PC

(57) ABSTRACT

An X-ray source including: a liquid target source configured to provide a liquid target moving along a flow axis; an electron source configured to provide an electron beam; and a liquid target shaper configured to shape the liquid target to include a non-circular cross section with respect to the flow axis, wherein the non-circular cross section has a first width along a first axis and a second width along a second axis, wherein the first width is shorter than the second width, and wherein the liquid target includes an impact portion being intersected by the first axis; wherein the x-ray source is configured to direct the electron beam towards the impact portion such that the electron beam interacts with the liquid target within the impact portion to generate X-ray radiation.

20 Claims, 7 Drawing Sheets

(56) References Cited

U.S. PATENT DOCUMENTS

| | | | | |
|---|---|---|---|---|
| 6,324,255 | B1 | 11/2001 | Kondo et al. | |
| 9,330,879 | B2 | 5/2016 | Lewellen et al. | |
| 2003/0219097 | A1 * | 11/2003 | Buijsse | H05G 2/003 378/43 |
| 2006/0011864 | A1 * | 1/2006 | Koshelev | H05G 2/005 250/492.2 |
| 2007/0177715 | A1 | 8/2007 | Harding | |
| 2011/0080997 | A1 * | 4/2011 | Sukowski | H01J 35/13 378/21 |
| 2011/0116604 | A1 | 5/2011 | Faubel et al. | |
| 2012/0057680 | A1 * | 3/2012 | Hemberg | H05G 2/008 378/143 |
| 2012/0133265 | A1 | 5/2012 | Kakonyi | |
| 2013/0077070 | A1 * | 3/2013 | Schimmel | H05G 2/005 250/504 R |
| 2013/0301805 | A1 | 11/2013 | Hemberg et al. | |
| 2014/0016123 | A1 | 1/2014 | Chang et al. | |
| 2014/0219424 | A1 | 8/2014 | Smith et al. | |
| 2015/0170868 | A1 | 6/2015 | Heid et al. | |
| 2015/0208494 | A1 | 7/2015 | Rafac et al. | |
| 2015/0380202 | A1 | 12/2015 | Ollinger et al. | |
| 2016/0247656 | A1 * | 8/2016 | Hemberg | H01J 35/08 |
| 2021/0027974 | A1 | 1/2021 | Hansson et al. | |

FOREIGN PATENT DOCUMENTS

| | | | | |
|---|---|---|---|---|
| CN | 103854940 | A | 6/2014 | |
| EP | 0186401 | A2 | 7/1986 | |
| JP | H05-258692 | A | 10/1993 | |
| JP | 2006527469 | A | 11/2006 | |
| JP | 2013-070041 | A | 4/2013 | |
| JP | 2014503960 | A | 2/2014 | |
| JP | 2015523686 | A | 8/2015 | |
| WO | WO-0211499 | A1 * | 2/2002 | H05G 2/00 |
| WO | 2010083854 | A1 | 7/2010 | |
| WO | 2012087238 | A1 | 6/2012 | |
| WO | 2013185829 | A1 | 12/2013 | |

OTHER PUBLICATIONS

Office Action (First Office Action) dated Jul. 26, 2022, by the Japanese Patent Office in corresponding Japanese Patent Application No. 2020-529216, and an English Translation of the Office Action. (15 pages).

International Search Report (PCT/ISA/210) and Written Opinion (PCT/ISA/237) dated Feb. 25, 2019, by the European Patent Office as the International Searching Authority for International Application No. PCT/EP2018/083138.

Harding, "A power-voltage scaling law for liquid anode X-ray tubes", Radiation Physics and Chemistry, vol. 73, No. 2, 2005 (month unknown), pp. 69-75.

Office Action dated Dec. 31, 2020, by the Intellectual Property India—Government of India in corresponding Indian Patent Application No. 202017023696, with an English Translation. (6 pages).

Office Action mailed on Dec. 7, 2023, by the Intellectual Property Office in corresponding Korean Patent Application No. 10-2020-7018445, and an English Translation of the Office Action. (10 pages).

Office Action (First Office Action) mailed on Dec. 12, 2023, by the Japanese Patent Office in corresponding Japanese Patent Application No. 2022-195465, and an English Translation of the Office Action. (10 pages).

* cited by examiner

X-RAY SOURCE AND METHOD FOR GENERATING X-RAY RADIATION

TECHNICAL FIELD

An inventive concept described herein generally relates to electron impact X-ray sources, and to liquid targets for use in such X-ray sources.

BACKGROUND

Systems for generating X-rays by irradiating a liquid target are described in the applicant's International Applications PCT/EP2012/061352 and PCT/EP2009/000481. In these systems, an electron gun comprising a high-voltage cathode is utilized to produce an electron beam that impinges on a liquid jet. The target is preferably formed by a liquid metal with low melting point, such as indium, tin, gallium lead or bismuth, or an alloy thereof, provided inside a vacuum chamber. Means for providing the liquid jet may include a heater and/or cooler, a pressurizing means (such as a mechanical pump or a source of chemically inert propellant gas), a nozzle and a receptacle to collect liquid at the end of the jet. The X-ray radiation generated by the interaction between the electron beam and the liquid jet may leave the vacuum chamber through a window separating the vacuum chamber from the ambient atmosphere.

However, there is still a need for improved X-ray sources.

SUMMARY

It is an object of the present inventive concept to provide an improved X-ray source.

According to a first aspect of the inventive concept, an X-ray source is provided comprising: a liquid target source configured to provide a liquid target moving along a flow axis; an electron source configured to provide an electron beam; and a liquid target shaper configured to shape the liquid target to comprise a non-circular cross section with respect to the flow axis, wherein the non-circular cross section has a first width along a first axis and a second width along a second axis, wherein the first width is shorter than the second width, and wherein the liquid target comprises an impact portion being intersected by the first axis; wherein the x-ray source is configured to direct the electron beam towards the impact portion such that the electron beam interacts with the liquid target within the impact portion to generate X-ray radiation; and wherein the X-ray source further comprises an arrangement configured to move a location, within the impact portion, in which the electron beam interacts with the liquid target.

The present inventive concept is based on the realization that by providing the liquid target with a non-circular cross section, a wider impact surface for the electron beam may be achieved without having to increase e.g. the flow rate of the liquid target. A wider, or less curved, impact surface may also allow for multiple electron beams to simultaneously impact the liquid target, preferably along a direction perpendicular to the flow axis, and for larger or wider electron beam spots to be used without substantially impairing the focus of the X-ray spot. It will be appreciated that such an impact surface also may be used with electron beam spots being oval or even line shaped.

Further, a liquid target having a non-circular cross section may provide improved thermal properties compared to a corresponding liquid target having a circular cross section with similar width and flow rate. In particular, by reducing the width along one of the axes defining the cross section of the liquid target, a velocity of the liquid target may be increased, which hence may improve the thermal properties of the liquid target. In other words, the ability to thermally load the liquid target varies with the velocity of the liquid target. To preserve the velocity while increasing the width implies increasing the mass flow which in turn may put harder requirements on the pump system.

It is also desirable to be able to adjust the position of an impact portion relative to a position of the electron source and/or an X-ray window, through which the X-ray radiation may exit the X-ray source. Preferably, the impact portion and the electron source may be aligned such that the electron beam may impinge on the largest surface portion of the liquid target, i.e., the portion of the liquid target having the smallest degree of curvature. Furthermore, it may be desirable to increase the width of the target at the impact portion to provide a larger surface for the electron beam to impinge upon.

Further, it has been realized that the angle of incidence with which the electron beam impinges the liquid target may be of importance for e.g. the spatial distribution of the generated X-ray radiation. In particular, an angle of incidence with which the electron beam impinges the liquid target, and/or a location in which the electron beam impinges the liquid target, may be selectively adjusted by turning the first axis of the cross section with respect to a direction of the electron beam, or vice versa, and/or by adjusting a location in which the electron beam impinges the liquid target.

The term 'width' may, in the context of the present application, refer to a diameter or extent from side to side of the liquid target. In particular, the first width may be the largest width of the non-circular cross section along the first axis, and the second width may be the largest width of the non-circular cross section along the second axis. The first and second axis may be perpendicular to each other, and may intersect the flow axis. The second width may be in of the order of 100 μm, such as within the range 10 μm to 1000 μm, such as 100 μm to 500 μm, such as 150 μm to 250 μm. The ratio between the second width and the first width may in some examples be at least 1.05, such as at least 1.1, such as at least 1.5, such as at least 2, such as at least 5.

The term 'liquid target' may, in the context of the present application, refer to a stream or flow of liquid being forced through e.g. a nozzle and propagating through a system for generating X-rays. Even though the liquid target in general may be formed of an essentially continuous flow or stream of liquid, it will be appreciated that the liquid target additionally, or alternatively, may comprise or even be formed of a plurality of droplets. In particular, droplets may be generated upon interaction with the electron beam. Such examples of groups or clusters of droplets may also be encompassed by the term 'liquid target'.

The liquid target may have a non-circular cross section, which may conform to an oval, elliptic or otherwise elongated shape. By making the cross section more elongated, the curvature of the surface at the impact portion may be reduced. Eventually, the curvature may be sufficiently low to allow the surface at the impact portion to be approximated with a flat, two-dimensional surface. Such as target may also be referred to as a 'flat jet'. Put differently, the location of the impact portion may be selected as the part of the liquid target which bears the closest resemblance to a flat surface. A liquid curtain is an extreme example of such a jet, exhibiting a substantially flat surface which can be used as impact portion for the electron beam.

The liquid target may be formed of a liquid jet that, at least in the location of the impact region, propagates freely relative the surrounding environment. The material of the liquid jet may hence be exposed to the environment in the chamber of the X-ray source.

Typically, the liquid target material is a metal which preferably has a relatively low melting point. Examples of such metals include indium, gallium, tin, lead, bismuth and alloys thereof.

As will be described further in the following disclosure, an electron beam spot of the electron beam may have a round shape, or an elongated shape. In some examples, the elongated shape may also be realized as a line shape or line focus. For a line focus an aspect ratio may be defined, i.e. the ratio between focus width to focus height. A typical value of the aspect ratio attainable on a liquid target with circular cross section is 4. A liquid target with a non-circular cross section may enable larger aspect ratios; e.g. at least 6. The shape of electron beam spot may be chosen depending on the preferred flux and/or brightness of the generated X-ray radiation.

In order to fully appreciate the following disclosure, it may be noted that for large enough Weber numbers, a phenomenon called axis switching may be observed for a liquid target emanating from a nozzle having a non-circular opening. Axis switching is a phenomenon in which the cross section for e.g. a non-circular, such as e.g. elliptical, liquid target, evolves in such a manner that the major and minor axis periodically switch places along the flow direction of the liquid target. The wavelength of the switching increases with increased liquid target velocity. Further, the axis switching is dampened by viscosity, meaning that the amplitude of the axis switching approaches zero as the viscosity increases.

Consequently, it is to be understood that the impact portion may extend along the flow axis. Further, the impact portion may be described as a portion within a sector of the non-circular cross section. The portion may e.g. span sector having an angle of 180 degrees or less, such as e.g. 120 degrees or less, such as 90 degrees or less, such as 60 degrees or less, and may preferably be centered around the first axis.

The X-ray source may be further configured to direct the electron beam towards a specific region within the impact portion. Such a region may also be referred to as an interaction region. The impact portion may thus be understood as the portion, such as a surface portion or volume, that is intersected by the first axis, whereas the interaction region may be understood as the particular portion or region of the impact portion that is hit by the electron beam, and in which the X-ray radiation may be generated. The interaction region may be a volume extending a distance towards a center of the non-circular cross section, i.e. towards the flow axis. Likewise, the impact portion may be a volume, and may extend a distance towards the center of the non-circular cross section, i.e. towards the flow axis.

As is readily understood from the present disclosure, the arrangement may be configured to adjust the position in which the electron beam impinges the liquid target, or in other words, the location of the interaction region. This may be necessary in order to assure that the full size of the electron beam spot is allowed to interact with the liquid target, and in particular that the electron beam spot is allowed to interact with the liquid target within the impact portion.

The arrangement may for example comprise an electron optics arrangement for moving the electron beam relative to the liquid target. Alternatively, or additionally, the arrangement may be configured to cooperate with the liquid target shaper to move or adjust a location in which the electron beam interacts with the target. In an example, the arrangement may comprise a motor or actuator coupled to the liquid target shaper and arranged to move the target shaper in a manner that allows for the position or orientation of the liquid target to be adjusted. The arrangement may for example be configured to rotate the liquid target shaper around the flow axis, resulting in a corresponding rotation of the impact portion around the flow axis, such that an orientation and/or position of the impact portion in relation to the electron source may be varied. In further examples, the arrangement may be configured to translate the liquid target shaper in a direction orthogonal to the flow axis and/or the trajectory of the electron beam, and/or tilt the liquid target shaper relative to the flow axis.

In one example, the arrangement may be configured to control a magnetic field generator configured to generate a magnetic field in order to shape the liquid target to comprise the non-circular cross section. The magnetic field generator will be described in more detail in the following.

The above disclosure provides several examples of how the arrangement can be employed to adjust a relative position between the electron beam and the liquid target. Moving the interaction region and/or the impact portion may result in an adjustment of the angle of incidence of the electron beam. A purpose of such an amendment may be to increase the total X-ray flux along a viewing direction or at a sample position, to increase the brightness of the X-ray source, or to align the position of the X-ray source with other parts (e.g. optics) of an X-ray system. In an example, the adjustment of the angle of incidence and/or the location of the interaction region is based on a measured X-ray output.

The electron beam may interact with the impact portion at an angle of incidence which may be greater than 0 degrees. The angle of incidence may be defined as an angle of incidence with respect to a normal to the non-circular cross section.

An advantage with having the electron beam interacting with the impact portion at an angle of incidence greater than 0 degrees is that less X-rays may be absorbed in the liquid target. In particular, more X-rays can be transmitted via an X-ray window located at an angle, such as substantially perpendicular, to the direction of the electron beam. Consequently, the present arrangement may provide for increased total X-ray flux, and/or an increased X-ray brightness.

Below will follow, among other things, possible modifications of the X-ray source in order to provide for an adjustment of the angle of incidence and/or the location of the interaction region in which the electron beam impinges the liquid target. As will be understood from the following paragraphs, modifications may be directed to the liquid target, the electron beam, or a combination of the two.

The electron source may be configured to be rotated around the flow axis in order to adjust the angle of incidence of the electron beam and/or the location of the interaction region in which the electron beam impinges the target.

The liquid target shaper may comprise a nozzle having a non-circular opening in order to shape the liquid target to comprise the non-circular cross section. The opening may e.g. have a shape selected from the group comprising elliptic, rectangular, square, hexagonal, oval, stadium, and rectangular with rounded corners.

It will be appreciated that the X-ray source according to some embodiments may be configured to move the liquid target relative the electron beam so as to change the location in which the electron beam interacts with the liquid target. The movement may for example be realized in a direction perpendicular to the flow axis of the liquid jet and/or perpendicular to the propagation direction of the electron beam, resulting in a lateral shift of the location of the interaction region. The movement, or shift in position, of the interaction region may for example be achieved by means of the liquid target source.

In one example, the nozzle of the liquid target source may be configured to be moved along the flow axis in order to adjust the angle of incidence and/or the location of the interaction region.

In one example, the nozzle may be configured to be rotated around the flow axis in order to adjust the angle of incidence and/or the location of the interaction region.

In one example, the liquid target source may be configured to be moved in a direction perpendicular to the flow axis in order to adjust the angle of incidence and/or the location of the interaction region.

The liquid target shaper may comprise a magnetic field generator configured to generate a magnetic field in order to shape the liquid target to comprise the non-circular cross section. The magnetic field may be substantially perpendicular to the flow axis. The magnitude of the magnetic field may be non-uniform in the direction of the flow axis so that the liquid target experiences a field gradient as it travels along the flow axis. In other words, the magnetic field may comprise a magnetic field gradient. The mechanism for shaping the liquid target may be based on induced eddy currents within the liquid target, which hence may be electrically conductive. The magnetic field may be an alternating magnetic field.

An example may include a time varying component of the magnetic field directed along the flow axis. This field component may impart acceleration to the liquid target thus increase the thermal load that can be applied to the liquid target before vaporization or similar problems occur.

A maximum relative change of liquid target radius by the application of a magnetic field gradient can be written as:

$$\frac{\Delta r}{a} = \beta\,\sin(\alpha z^*)\int_{-\infty}^{z^*}\frac{\cos(\alpha t)}{\cosh^2(\varepsilon_m t)}dt - \beta\,\cos(\alpha z^*)\int_{-\infty}^{z^*}\frac{\sin(\alpha t)}{\cosh^2(\varepsilon_m t)}dt$$

where $$\alpha = \sqrt{6/We},\ \beta = \varepsilon_m N_a/8\alpha,\ N_a = \sigma_e B_0^2 a/\rho v_0,\ \varepsilon_m = a/L_m$$

and $$We = \frac{\rho v_0^2 a}{\sigma}$$

$N_a$ as defined above is called the Stuart number, W e is the Weber number, a is the nozzle radius, $B_0$ is the magnitude of the magnetic field, $L_m$ is the length scale of the magnetic field gradient, and $\sigma_e$ is the electrical conductivity of the liquid target.

In one example, the liquid target consists of liquid gallium, and the following values are input into the formula above:

$\rho$=6100 kg/m$^3$, $\sigma$=0.7 N/m, a=100 μm, v=100 m/s, $\sigma_e$=4 MS/m, $B_0$=1.7 T, and $L_m$=1 mm, which may give a maximum change in liquid target radius of a few percent.

Similar to the case with an elliptic nozzle the shape of the liquid target may oscillate along the flow axis. The values used above gives a wavelength of about 250 nozzle radiuses, i.e. 25 mm. If the exit velocity of the liquid target is increased to 1000 m/s (i.e. the Weber number goes up a factor of 100) the amplitude is about the same, but the wavelength is increased a factor of 10. One way of increasing the magnitude of the relative radius change may be to increase the magnetic field, since the magnitude scales with the Stuart number, i.e. with the square of the magnetic field. Another way to increase the effect may be to increase the Weber number. This can be done without affecting the Stuart number by decreasing the surface tension. This may in turn be achieved by increasing the temperature. As an example, by increasing the magnetic field to 4 T the magnitude of the effect is about 10% in relative change of the radius. As a side note, the magnitude may also increase with increasing nozzle diameter. This may however be counterproductive as discussed above, since just increasing the diameter may result in a lower speed, provided the mass flow is preserved. A lower speed may in turn imply a lower allowed thermal load on the liquid target.

The magnetic field generator may be configured to adjust the magnetic field in order to adjust the angle of incidence and/or the location of the interaction region.

The magnetic field may be non-uniform. In particular, the magnetic field generator may be configured to adjust a direction of a non-uniform magnetic field in order to adjust the angle of incidence and/or the location of the interaction region.

In one example, the magnetic field generator may be configured to generate a magnetic field that moves the liquid target such that the position of the interaction region is moved relative the electron beam.

The liquid target source may be configured to provide an adjustable flow rate of the liquid target in order to adjust the first and second width.

The liquid target may be a metal.

The X-ray source may be configured to turn the impact region with respect to a direction of the electron beam. In other words, the X-ray source may be configured to turn the first axis of the non-circular cross section with respect to a direction of the electron beam.

It is to be understood that a nozzle and a magnetic field generator as described above may both be present in the X-ray source according to the inventive concept.

According to a second aspect of the inventive concept a method for generating X-ray radiation is provided. The method comprises: providing an electron beam; providing a liquid target moving along a flow axis, the liquid target comprising a non-circular cross section with respect to the flow axis, wherein the non-circular cross section has a first width along a first axis and a second width along a second axis, wherein the first width is shorter than the second width, and wherein the liquid target comprises an impact portion being intersected by the first axis; directing the electron beam towards the impact portion such that the electron beam interacts with the liquid target within the impact portion to generate X-ray radiation.

The method may further comprise moving the electron beam along the flow axis and/or in a direction perpendicular to the flow axis in order to move the location in which the electron beam interacts with the liquid target, i.e., the interaction region.

The method may further comprise rotating the electron source around the flow axis in order to adjust the angle of incidence and/or the location of the interaction region.

The method may further comprise moving the nozzle along the flow axis in order to adjust the angle of incidence and/or the location of the interaction region.

The method may further comprise rotating the nozzle around the flow axis in order to adjust the angle of incidence and/or the location of the interaction region.

The step of providing the liquid target may comprise providing a magnetic field for shaping the non-circular cross section of the liquid target.

The method may further comprise adjusting the magnetic field in order to adjust the angle of incidence and/or the location of the interaction region.

The method may further comprise adjusting a flow rate of the liquid target in order to adjust the first and second width.

The method may further comprise turning the impact region with respect to a direction of the electron beam.

The method may further include a step of scanning the electron beam between the liquid target and an unobscured portion of a sensor area in order to determine, e.g., a width of the electron beam, preferably at the impact portion. The sensor area, which may form part of the X-ray source according to the first aspect, may be arranged behind the liquid target as seen from the electron source, such that the liquid target at least partly obscures the sensor area. This arrangement allows for the electron beam to be scanned into and/or out of the liquid target and to impinge on the unobscured portion(s) of the sensor area. The output signal from the sensor may then be analyzed to determine the width of the liquid target, preferably in the scanning direction or a direction perpendicular to the flow axis.

The determined width of the liquid target may be used as feedback, or an adjustment parameter, for the operation of the liquid target source, the liquid target shaper and/or the electron beam. The aim of such feedback or adjustments may be to control the width of the liquid target, preferably at the impact portion. Thus, the width may be varied by adjusting a flow rate of the liquid target, by rotating the impact portion around the flow axis, by moving the location in which the electron beam interacts with the liquid target, and/or by adjusting an angle of incidence between the electron beam and a surface of the impact portion.

In one example, the method according to the second aspect may include measurement of the X-ray output, such as e.g. X-ray flux and/or X-ray brightness. The measurements may be performed by sensor means for characterizing or quantifying the generated X-ray radiation. Similar to the feedback mechanism described above, the measured X-ray output may be used for controlling the interaction between the electron beam and the liquid target to achieve a desired output, e.g. in terms of flux or brightness. The interaction may e.g. be controlled by rotating the impact portion around the flow axis, moving the location in which the electron beam interacts with the liquid target, or by adjusting an angle of incidence between the electron beam and a surface of the impact portion.

A feature described in relation to a first one of the above aspects may also be incorporated in the other one of the above aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

Figure 1A:
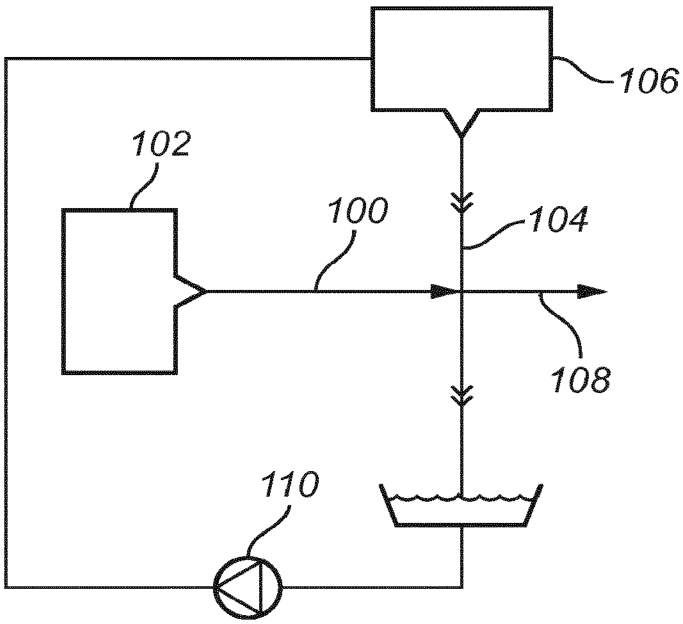
FIG. 1*a* schematically illustrates an X-ray source.

The figures are not necessarily to scale, and generally only show parts that are necessary in order to elucidate the inventive concept, wherein other parts may be omitted or merely suggested.

DETAILED DESCRIPTION

An X-ray source according to the inventive concept will now be described with reference to FIG. 1*a*. An electron beam 100 is generated from an electron source 102, such as e.g. an electron gun comprising a high-voltage cathode, and a liquid target 104 is provided from a liquid target source 106. The electron beam 100 is directed towards an impact portion of the liquid target 104 such that the electron beam 100 interacts with the liquid target 104 and X-ray radiation 108 is generated. The liquid target 104 is preferably collected and returned to the liquid target source 106 by means of a pump 110, such as a high-pressure pump adapted to raise the pressure to at least 10 bar, preferably to at least 50 bar, for generating the liquid target 104.

The liquid target 104, i.e. the anode, may be formed by the liquid target source 106 comprising a nozzle through which a fluid, such as e.g. liquid metal or liquid alloy, may be ejected to form the liquid target 104. It should be noted that it is to be understood that an X-ray source comprising multiple liquid targets, and/or multiple electron beams, is possible within the scope of the inventive concept.

Still referring to FIG. 1*a*, the X-ray source may comprise an X-ray window (not shown) configured to allow X-ray radiation, generated from the interaction of the electron beam 100 and the liquid target 104, to be transmitted. The X-ray window may be located substantially perpendicular to a direction of travel of the electron beam.

Figure 1B:
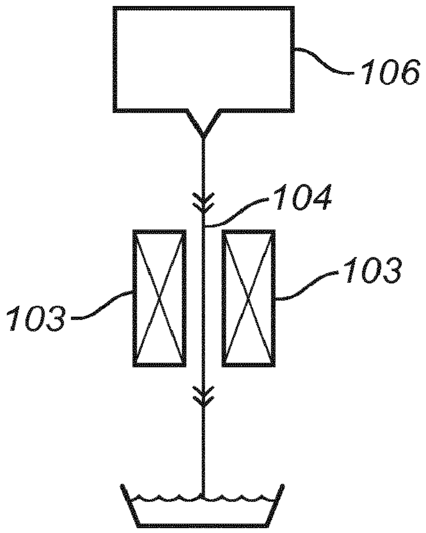
FIG. 1*b* schematically illustrates an X-ray source provided with a magnetic field generator.

Referring now to FIG. 1*b*, a magnetic field generator 103 is shown in relation to the liquid target source 106 and the liquid target 104. The magnetic field generator 103 and the liquid target 104 may be comprised in an X-ray source that may be similarly configured as the X-ray source discussed in connection with FIG. 1*a*. It is to be understood that the magnetic field generator 103 may extend further along the flow axis, and that the placement of the magnetic field generator 103 shown is merely an example among several different configurations. In the present example, the magnetic field generator 103 may comprise a plurality of means for generating a magnetic field for modifying or shaping a cross section of the liquid target 104. Examples of such means may e.g. include electromagnets, which e.g. may be arranged at different sides of a path of the liquid target 104 so as to affect its shape.

Figure 2:
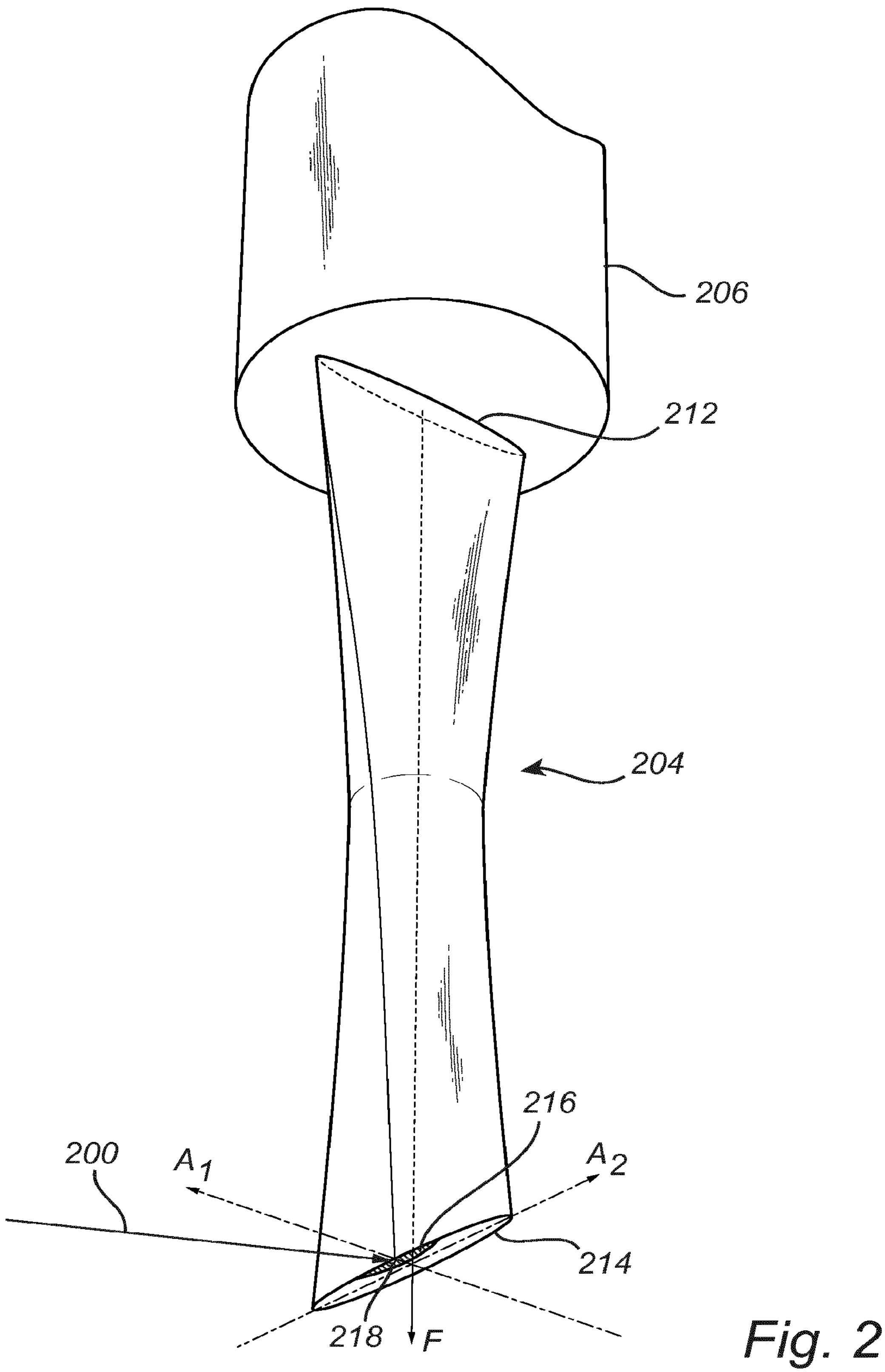
FIG. 2 schematically illustrates a perspective view of a liquid target.

Referring now to FIG. 2, an example of a liquid target 204 moving along a flow axis F is illustrated. The liquid target is generated by the liquid target source 206. The X-ray source comprises a liquid target shaper, e.g. a nozzle 212 having a non-circular opening, in order to shape the liquid target 206 to comprise a non-circular cross section 214. In the illustrated example, the nozzle 212 has an elliptical opening. The non-circular cross section 214 has a first width, also referred to as diameter, along a first axis $A_1$ and a second width, or diameter, along a second axis $A_2$, wherein the first diameter is shorter than the second diameter. The liquid target 204 comprises an impact portion 216 being intersected by the first axis $A_1$. Here, the impact portion 216 is illustrated as a uniform area centered around the first axis $A_1$. However, it is to be understood that the impact portion 216 may have any arbitrary shape. Further, it should be noted that the impact portion 216 is here only illustrated in the non-circular cross section, although it is possible for the impact portion 216 to extend along the flow axis F.

An electron beam 200 is directed towards the impact portion 216, such that the electron beam 200 interacts with the liquid target 206 and X-ray radiation is generated. In particular, the electron beam 200 is directed to an interaction region 218 located within the impact region 216. The interaction region may be defined as a region wherein X-rays are generated when hit by the electron beam.

Depending on the properties of the liquid target 204, as discussed earlier in the present disclosure, axis switching may be observed. In FIG. 2, it can be seen that the first and second axis switch places along the flow axis F. The axes of the liquid target 204, i.e. the first axis $A_1$ and the second axis $A_2$, may switch places several times along the flow axis F, with a wavelength being proportional to a velocity of the liquid target along the flow axis F. In particular, the wavelength of axis switching is proportional to the square root of the Weber number, which corresponds to a linear velocity dependence. For certain parameter combinations situations where only one axis switch event occurs may be observed, e.g. a liquid target ejected from an elongated nozzle turns 90 degrees and then continues without turning over the observable distance.

Figure 3:
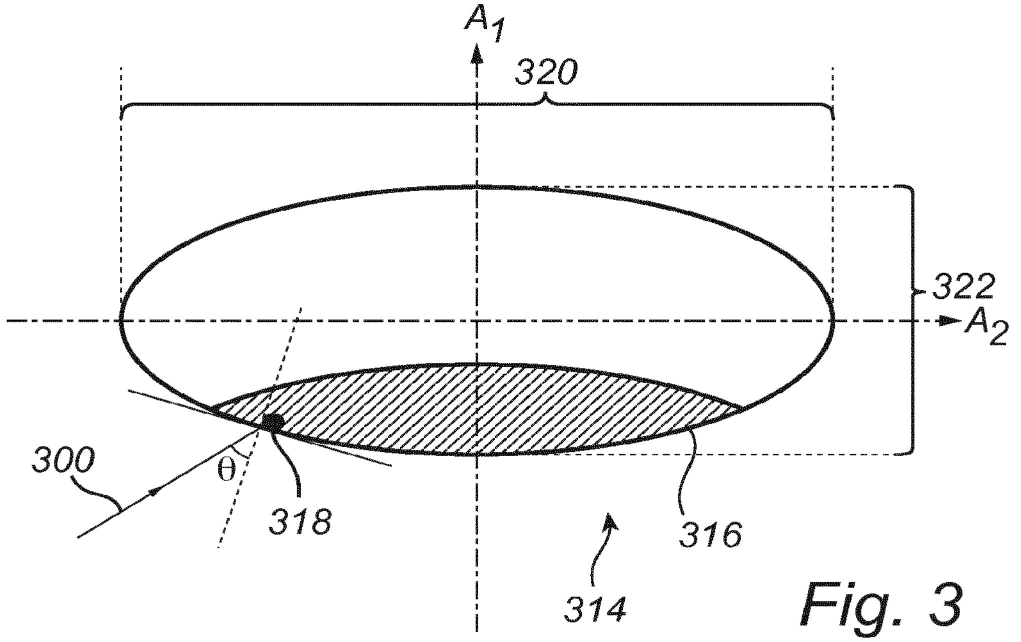
FIG. 3 schematically illustrates a non-circular cross section of a liquid target.

Referring now to FIG. 3, a non-circular cross section 314 is illustrated in detail. The non-circular cross section 314 may form part of a liquid target of an X-ray source similar to the ones discussed above in connection with FIGS. 1 and 2. It should be noted that the interaction region 318 is not necessarily drawn to scale in this figure. The non-circular cross section 314 comprises a first diameter 322 along a first axis $A_1$, and a second diameter 320 along a second axis $A_2$, wherein the first diameter 322 is shorter than the second diameter 320. The impact portion 316 as can be seen is being intersected by the first axis $A_1$. The electron beam 200 here interacts with the liquid target at an angle of incidence $\theta$ greater than 0 degrees.

Figure 4A:
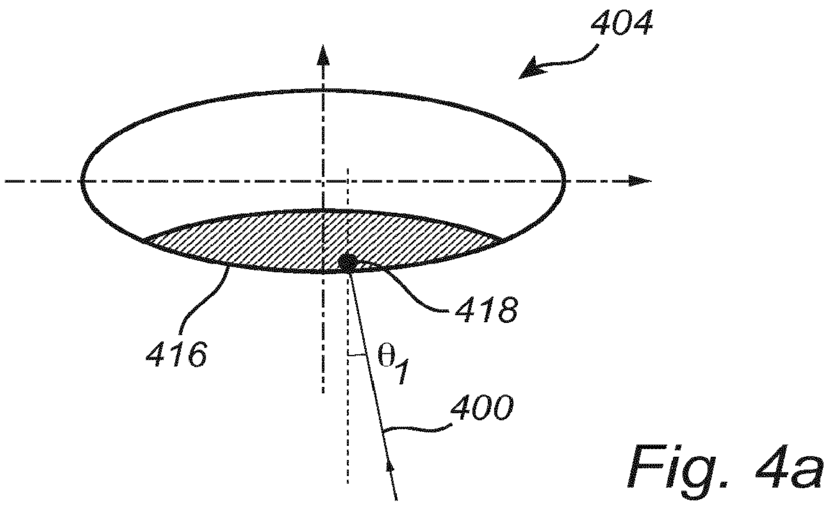
FIGS. 4*a*-4*b* schematically illustrate a movement of an electron source in order to adjust an angle of incidence and/or a location of an interaction region.
Figure 4B:
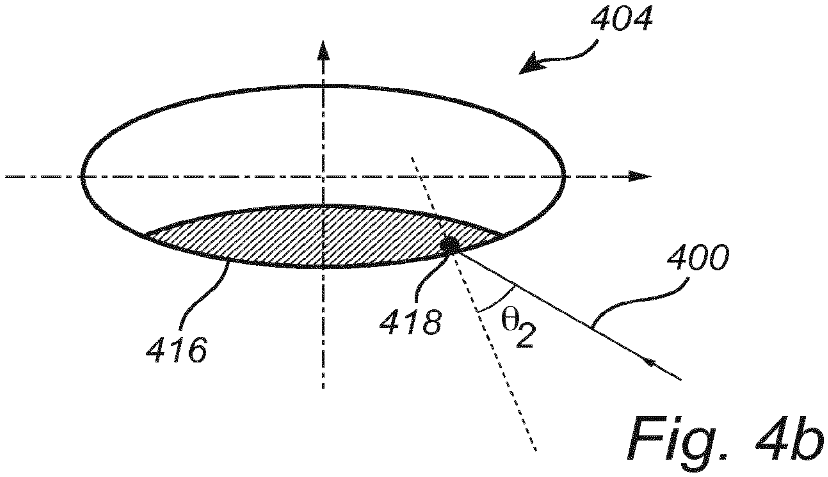

Referring now to FIG. 4*a*, an electron beam 400 is shown interacting with a liquid target 404 at an angle of incidence $\theta_1$. The interaction region 418 is located within the impact portion 416. In order to adjust the angle of incidence and/or the location of the interaction region 418, the electron source (not shown) providing the electron beam 400 may be rotated with respect to the flow axis. As shown in FIG. 4*b*, such a rotation may result in the electron beam 400 interacting with the liquid target 404 at an angle of incidence $\theta_2$, and the location of the interaction region 418 may also be changed within the impact portion 416.

Figure 4C:
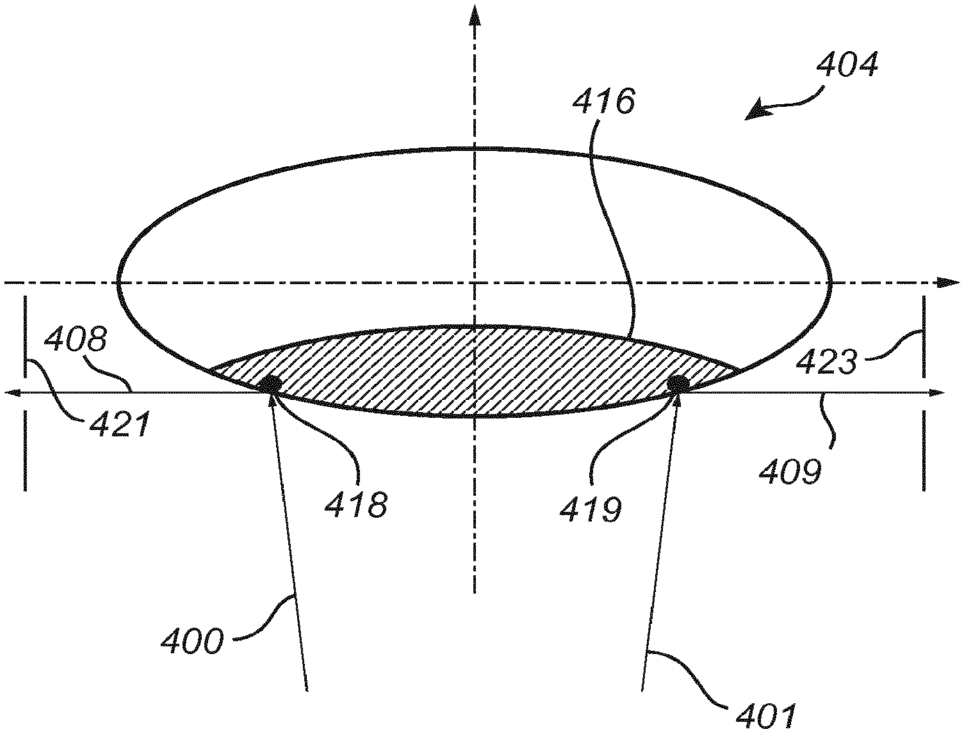
FIG. 4*c* schematically illustrate a non-circular cross section of a liquid target being impinged by a plurality of electron beams.

Referring now to FIG. 4*c*, a first and a second electron beam 400, 401 are shown interacting with a liquid target 404. Respective first and second interaction regions 418, 419 are illustrated. The first and second interaction regions 418, 419 are arranged within the impact portion 416. X-ray radiation 408 generated in the first interaction region 418 is transmitted through a first X-ray window 421 located substantially perpendicular to the direction of the first electron beam 400. X-ray radiation 409 generated in the second interaction region 419 is transmitted through a second X-ray window 423 located substantially perpendicular to the direction of the second electron beam 401. As can be seen, X-ray radiation may preferably be transmitted via an X-ray window located in a direction pointing away from the first axis of the non-circular cross section with respect to the interaction region in which the X-ray radiation is generated. This is to avoid dampening of the X-ray radiation caused by absorption in the liquid target.

Figure 4D:
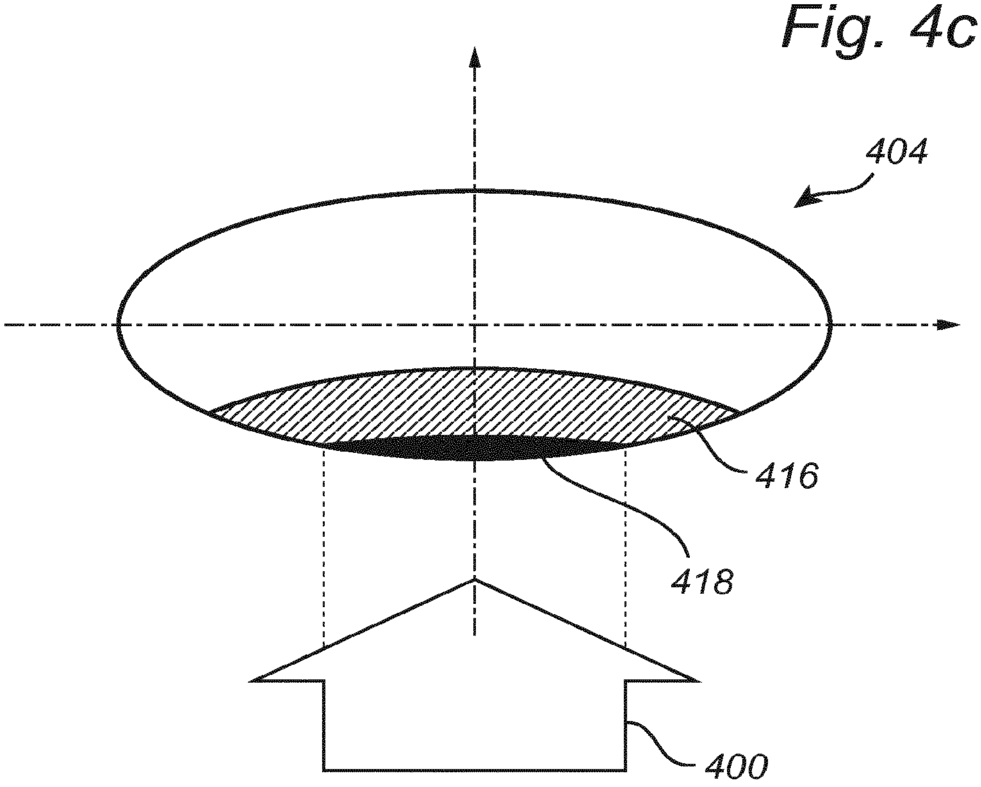
FIG. 4*d* schematically illustrate an electron beam having an elongated cross-section.

Referring now to FIG. 4*d*, an electron beam 400 having an elongated cross-section is illustrated. The interaction region 418 located within the impact portion 416 may thus assume an elongated or line shape as seen in the illustrated cross-section. When utilizing an electron beam 400 having an elongated cross-section, it may be advantageous to direct the electron beam 400 towards the impact portion, according to the inventive concept, in order to achieve improved focal properties. Further, X-ray radiation generated in the interaction region 418 may be transmitted via X-ray windows located on either or both sides of the first axis.

Figure 5A:
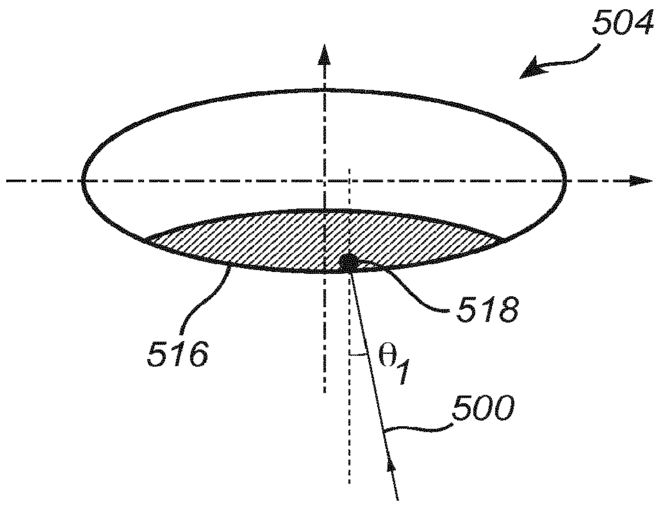
FIGS. 5*a*-5*b* schematically illustrate a shaping of the liquid target in order to adjust an angle of incidence and/or a location of an interaction region.
Figure 5B:
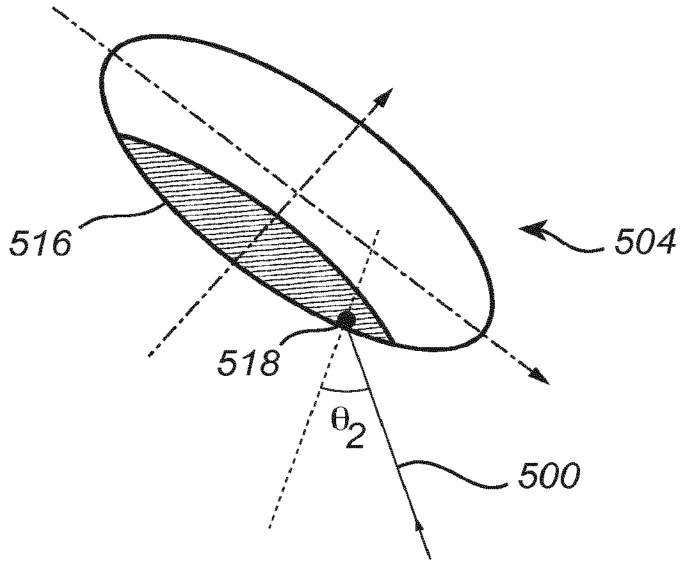

Referring now to FIG. 5*a*, an electron beam 500 is shown interacting with a liquid target 504 at an angle of incidence $\theta_1$. The interaction region 518 is located within the impact portion 516. In order to adjust the angle of incidence and/or the location of the interaction region 518, the liquid target 504 may be rotated around the flow axis. This may be achieved by e.g. rotating the nozzle around the flow axis, and/or by adjusting a magnetic field arranged to shape the liquid target 504 to comprise the non-circular cross section. As shown in FIG. 5*b*, a rotation of the liquid target 504 around the flow axis may result in the electron beam 500 interacting with the liquid target 504 at an angle of incidence $\theta_2$, and the location of the interaction region 518 may also be changed within the impact portion 516.

Figure 6A:
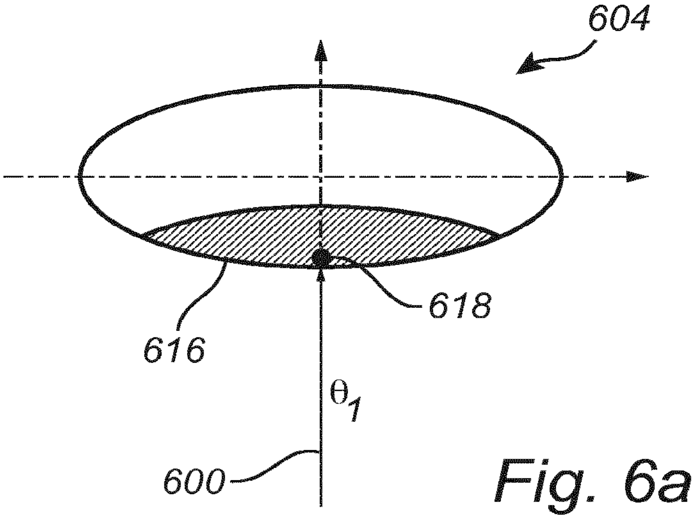
FIGS. 6*a*-6*b* schematically illustrate a movement of an electron beam in order to adjust an angle of incidence and/or a location of an interaction region.
Figure 6B:
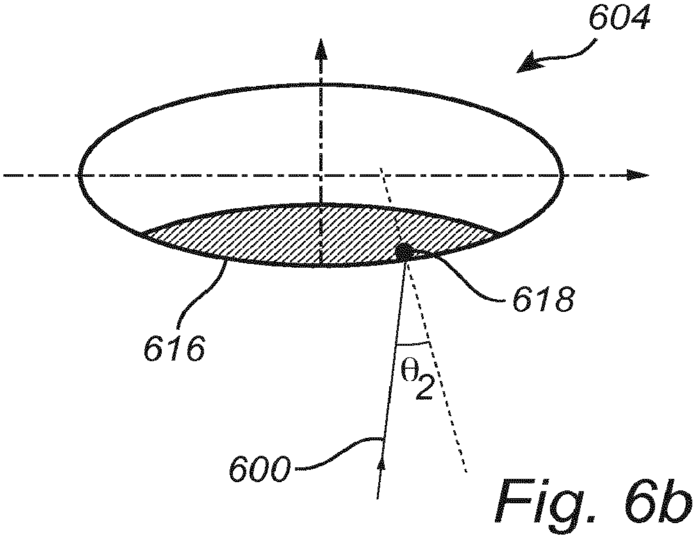

Referring now to FIG. 6*a*, an electron beam 600 is shown interacting with a liquid target 604 at an angle of incidence $\theta_1$. Here, $\theta_1$ is substantially zero. The interaction region 618 is located within the impact portion 616. In order to adjust the angle of incidence and/or the location of the interaction region 616, the electron beam 600 may be moved along the flow axis and/or in a direction perpendicular to the flow axis. The illustrated example shows a movement of the electron beam 600 in a direction perpendicular to the flow axis. The movement of the electron beam 600 along the flow axis and/or in a direction perpendicular to the flow axis may be achieved by having an electron optics arrangement (not shown) configured to move the electron beam 600. The term "move" should be interpreted to comprise focusing, and/or deflecting the electron beam. As shown in FIG. 6*b*, moving the electron beam 600 as disclosed above may result in the electron beam 600 interacting with the liquid target 604 at an angle of incidence $\theta_2$, and the location of the interaction region 618 may also be changed within the impact portion 616.

Further, although not illustrated, it may be possible to move the nozzle of the liquid target shaper along the flow axis, and/or adjusting a magnetic field generated by a magnetic field generator, in order to adjust the angle of incidence and/or the location of the interaction region. The resulting adjustment of the angle of incidence and/or the location of the interaction region is similar to what has been disclosed above in conjunction to FIGS. 4*a*-6*b*.

Further, it is to be understood that any of combination of the adjustments disclosed above in conjunction with FIGS. 4*a*-6*b* is possible within the scope of the inventive concept.

By providing suitable sensor means and a controller (not shown) the adjustments disclosed above in conjunction with FIGS. 4*a*-6*b* may be performed to achieve a desired performance. One example is to provide increased X-ray flux at a sample position, as measured by the number of X-ray photons per second. Another example is to provide increased X-ray brightness, i.e. number of photons per time, area and solid angle. To measure the brightness a detector capable of registering the spatial distribution of X-ray radiation intensity may be required. The adjustments may be controlled by a suitable control algorithm, e.g., a PID controller.

As previously mentioned in connection with FIG. 4*c*, the X-ray source may comprise more than one electron beam, thus providing more than one interaction region. One example of this would be a dual port source, i.e. when there are two X-ray windows at opposite directions substantially perpendicular to two substantially parallel electron beams. With this arrangement the two spots may be adjusted individually to achieve the desired performance. Another example is to provide multiple X-ray sources radiating in the same direction for interferometric applications, e.g. Talbot-Lau interferometry. In this context one may note that a wide target may be preferable since the thermal load can be distributed over the width with a multiple of spots distributed substantially perpendicularly to the flow axis interacting with the liquid target. If, instead, the spots were arranged along the flow axis the allowed thermal load would be less since the downstream interaction regions would be exposed to the thermal load of the upstream interaction regions as well.

Figure 7:
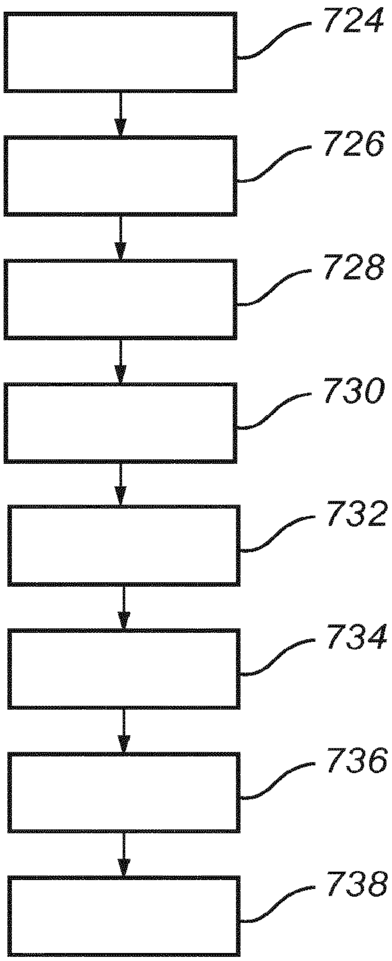
FIG. 7 is a flowchart of a method for generating X-ray radiation.

A method for generating X-ray radiation according to the inventive concept will now be described with reference to FIG. 7. For clarity and simplicity, the method will be described in terms of 'steps'. It is emphasized that steps are not necessarily processes that are delimited in time or separate from each other, and more than one 'step' may be performed at the same time in a parallel fashion.

In step 724, a liquid target moving along a flow axis is provided. In step 726, an electron beam is provided. In step 728, the liquid target is shaped to comprise a non-circular cross section with respect to the flow axis, wherein the non-circular cross section comprises a first diameter that is shorter than a second diameter, and wherein the liquid target comprises an impact portion being intersected by the first axis. In step 730 the electron beam is directed towards the impact portion such that the electron beam interacts with the liquid target within the impact portion to generate X-ray radiation.

The method may further include steps for adjusting the impact portion to provide a wider impact portion for the electron beam to interact with. The width of the liquid target may be measured by scanning 732 the electron beam across the liquid target and measuring a current absorbed in an e-dump (not shown) located downstream of the liquid target in the direction of the electron beam. Steps for controlling 734 the width towards a desired value may further be included.

Alternatively, or additionally the method may include steps for measuring 736 an X-ray output, such as e.g. X-ray flux or X-ray brightness, and controlling 738 the generation of the X-ray radiation based on the measured X-ray output.

The person skilled in the art by no means is limited to the example embodiments described above. On the contrary, many modifications and variations are possible within the scope of the appended claims. In particular, X-ray sources and systems comprising more than one liquid target are conceivable within the scope of the present inventive concept. Furthermore, X-ray sources of the type described herein may advantageously be combined with X-ray optics and/or detectors tailored to specific applications exemplified by but not limited to medical diagnosis, non-destructive testing, lithography, crystal analysis, microscopy, materials science, microscopy surface physics, protein structure determination by X-ray diffraction, X-ray photo spectroscopy (XPS), critical dimension small angle X-ray scattering (CD-SAXS), and X-ray fluorescence (XRF). Additionally, variation to the disclosed examples can be understood and effected by the skilled person in practicing the claimed invention, from a study of the drawings, the disclosure, and the appended claims. The mere fact that certain measures are recited in mutually different dependent claims does not indicate that a combination of these measures cannot be used to advantage.

Embodiments

1. An X-ray source comprising:

a liquid target source configured to provide a liquid target moving along a flow axis;

an electron source configured to provide an electron beam; and a liquid target shaper configured to shape the liquid target to comprise a non-circular cross section with respect to the flow axis, wherein the non-circular cross section has a first width along a first axis and a second width along a second axis, wherein the first width is shorter than the second width, and wherein the liquid target comprises an impact portion being intersected by the first axis;

wherein the X-ray source is configured to direct the electron beam towards the impact portion such that the electron beam interacts with the liquid target within the impact portion to generate X-ray radiation; and wherein the X-ray source further comprises an arrangement configured to move a location, within the impact portion, in which the electron beam interacts with the liquid target.

2. The X-ray source according to embodiment 1, wherein the arrangement is an electron optics arrangement configured to move the electron beam relative to the liquid target.

3. The X-ray source according to embodiment 1, wherein the arrangement is configured to cooperate with the liquid target shaper to move the location, within the impact portion, in which the electron beam interacts with the liquid target.

4. The X-ray source according to embodiment 3, wherein the arrangement is configured to rotate the target shaper around the flow axis.

5. The X-ray source according to embodiment 3, wherein the arrangement is configured to move the target shaper in a direction orthogonal to the flow axis.

6. The X-ray source according to embodiment 3, wherein the arrangement is configured to tilt the target shaper relative to the flow axis.

7. The X-ray source according to any one of the preceding embodiments, wherein the liquid target shaper comprises a nozzle having a non-circular opening in order to shape the liquid target to comprise the non-circular cross section.

8. The X-ray source according to embodiment 7, wherein the arrangement is configured to move the nozzle along the flow axis in order to adjust a location and/or orientation of the impact portion in relation to the electron beam.

9. The X-ray source according to embodiment 7, wherein the non-circular opening has a shape selected from the group comprising elliptic, rectangular, square, hexagonal, oval, stadium, and rectangular with rounded corners.

10. The X-ray source according to embodiment 1, wherein the liquid target shaper comprises a magnetic field generator configured to generate a magnetic field for shaping the liquid target to comprise the non-circular cross section.

11. The X-ray source according to embodiment 10, wherein the magnetic field generator is configured to adjust the magnetic field in order to adjust a location and/or orientation of the impact portion in relation to the electron beam.

12. The X-ray source according to any one of the preceding embodiments, wherein the electron source is configured to generate a plurality of electron beams interacting with the liquid target within the impact portion.

13. The X-ray source according to any one of the preceding embodiments, wherein the liquid target is a metal.

14. A method for generating X-ray radiation, the method comprising:

providing an electron beam;

providing a liquid target moving along a flow axis, the liquid target comprising a non-circular cross section with respect to the flow axis, wherein the non-circular cross section has a first width along a first axis and a second width along a second axis, wherein the first width is shorter than the second width, and wherein the liquid target comprises an impact portion being intersected by the first axis;

directing the electron beam towards the impact portion such that the electron beam interacts with the liquid target within the impact portion to generate X-ray radiation; and moving a location, within the impact portion, in which the electron beam interacts with the liquid target.

15. The method according to embodiment 14, further comprising:

adjusting an angle of incidence between the electron beam and a surface of the impact portion.

16. The method according to embodiment 14, further comprising:

scanning the electron beam between the liquid target and an unobscured portion of a sensor area arranged to be at least partly obscured by the liquid target;

determining a width of the liquid target based on a signal from the sensor area;

and, based on the determined width, performing at least one of:

rotating the impact portion around the flow axis;

moving the location in which the electron beam interacts with the liquid target; and adjusting an angle of incidence between the electron beam and a surface of the impact portion.

17. The method according to embodiment 13, further comprising:

measuring an X-ray output; and:

based on the measured X-ray output, performing at least one of:

rotating the impact portion around the flow axis;

moving the location in which the electron beam interacts with the liquid target; and adjusting an angle of incidence between the electron beam and a surface of the impact portion;

wherein said X-ray output is selected from X-ray flux and X-ray brightness.

LIST OF REFERENCE SIGNS

100 Electron beam
102 Electron source
103 Magnetic field generator
104 Liquid target
106 Liquid target source
108 X-ray radiation
110 Pump
200 Electron beam
204 Liquid target
206 Liquid target source
212 Nozzle
214 Non-circular cross section
216 Impact portion
218 Interaction region
300 Electron beam
314 Liquid target
316 Impact portion
318 Interaction region
320 Second width
322 First width
400 First electron beam
401 Second electron beam
404 Liquid target
408 X-ray radiation
409 X-ray radiation
416 Impact portion
418 First interaction region
419 Second interaction region
421 First X-ray window
423 Second X-ray window
500 Electron beam
504 Liquid target
516 Impact portion
518 Interaction region
600 Electron beam
604 Liquid target
616 Impact portion
618 Interaction region
724 Step of providing a liquid target
726 Step of providing an electron beam

728 Step of shaping the liquid target
730 Step of directing the electron beam
732 Step of scanning the electron beam
734 Step of controlling a width
736 Step of measuring an X-ray output
738 Step of controlling the X-ray output

The invention claimed is:

1. An X-ray source comprising:

a liquid target source configured to provide a liquid target moving along a flow axis by ejecting a liquid through a nozzle of the liquid target source;

an electron source configured to provide an electron beam; and a liquid target shaper configured to shape the liquid target to comprise a non-circular cross section in a plane perpendicular to the flow axis, wherein the non-circular cross section has a first width along a first axis and a second width along a second axis, wherein the first width is shorter than the second width, wherein the second width is at least 150 μm, and wherein the liquid target comprises an impact portion being intersected by the first axis;

wherein the X-ray source is configured to direct the electron beam towards the impact portion as a line focus having an aspect ratio of at least 6 such that the electron beam interacts with the liquid target within the impact portion to generate X-ray radiation; and the X-ray source further comprising:

an arrangement configured to move a location, within the impact portion, in which the electron beam interacts with the liquid target; and a pump adapted to raise a pressure in the liquid target source to at least 50 bar for generating the liquid target.

2. The X-ray source according to claim 1, wherein the second width is at least 500 μm.

3. The X-ray source according to claim 1, wherein the second width is within the range 150 μm to 1000 μm.

4. The X-ray source according to claim 1, wherein the second width is within the range 250 μm to 1000 μm.

5. The X-ray source according to claim 1, wherein the second width is within the range 500 μm to 1000 μm.

6. The X-ray source according to claim 1, wherein a ratio between the second width and the first width is at least 5.

7. The X-ray source according to claim 1, wherein the nozzle has a non-circular opening in order to shape the liquid target to comprise the non-circular cross section.

8. The X-ray source according to claim 7, wherein the non-circular opening has a shape selected from the group comprising elliptic, rectangular, square, hexagonal, oval, stadium, and rectangular with rounded corners.

9. The X-ray source according to claim 1, wherein the liquid target shaper comprises a magnetic field generator configured to generate a magnetic field for shaping the liquid target to comprise the non-circular cross section.

10. The X-ray source according to claim 1, wherein the liquid is a metal or an alloy.

11. The X-ray source according to claim 1, wherein the liquid target propagates freely along the flow axis.

12. A method for generating X-ray radiation, the method comprising:

providing an electron beam;

providing a liquid target moving along a flow axis by ejecting a liquid through a nozzle, the liquid target comprising a non-circular cross section in a plane perpendicular to the flow axis, wherein the non-circular cross section has a first width along a first axis and a second width along a second axis, wherein the first width is shorter than the second width, wherein the second width is at least 150 μm, and wherein the liquid target comprises an impact portion being intersected by the first axis;

directing the electron beam towards the impact portion as a line focus having an aspect ratio of at least 6 such that the electron beam interacts with the liquid target within the impact portion to generate X-ray radiation; and moving a location, within the impact portion, in which the electron beam interacts with the liquid target;

wherein the liquid is ejected through the nozzle at a pressure of at least 50 bar.

13. The method according to claim 12, wherein the second width is at least 500 μm.

14. The method according to claim 12, wherein the second width is within the range 150 μm to 1000 μm.

15. The method according to claim 12, wherein the second width is within the range 250 μm to 1000 μm.

16. The method according to claim 12, wherein the second width is within the range 500 μm to 1000 μm.

17. The method according to claim 12, wherein a ratio between the second width and the first width is at least 5.

18. The method according to claim 12, wherein the nozzle has a non-circular opening in order to shape the liquid target to comprise the non-circular cross section.

19. The method according to claim 12, wherein the liquid is a metal or an alloy.

20. The method according to claim 12, wherein the liquid target propagates freely along the flow axis.

* * * * *